United States Patent [19]

Binger

[11] Patent Number: 5,326,446

[45] Date of Patent: Jul. 5, 1994

[54] TREATMENT OF WATER WITH STATIC AND RADIO FREQUENCY ELECTROMAGNETIC FIELDS

[76] Inventor: Larry Binger, P.O. Box 790511, San Antonio, Tex. 78279

[21] Appl. No.: 920,610

[22] Filed: Jul. 27, 1992

[51] Int. Cl.$^5$ .................................................. C02F 1/46
[52] U.S. Cl. ..................................... 204/305; 204/302; 204/149; 204/186; 210/748
[58] Field of Search ............... 204/149, 186, 302, 305; 210/748

[56] References Cited

U.S. PATENT DOCUMENTS

| | | | |
|---|---|---|---|
| 930,023 | 8/1909 | Bartley | 204/149 |
| 2,540,223 | 2/1951 | Tolman | 426/247 |
| 3,547,801 | 12/1970 | Paine | 204/305 |
| 3,753,886 | 8/1973 | Myers | 204/186 |
| 3,783,114 | 1/1974 | Ishii et al. | 204/149 |
| 4,048,030 | 9/1977 | Miller | 204/149 |
| 4,378,276 | 3/1983 | Liggett et al. | 204/149 |
| 4,419,206 | 12/1983 | Frame | 204/228 |
| 4,451,341 | 5/1984 | Miller | 204/149 |
| 4,719,018 | 1/1988 | Przyblski | 204/305 |
| 4,734,176 | 3/1988 | Zimba, Jr. et al. | 204/149 |
| 4,822,472 | 4/1989 | Reis et al. | 204/302 |
| 4,865,748 | 9/1989 | Morse | 204/149 |
| 4,871,450 | 10/1989 | Goodrich et al. | 210/151 |
| 4,872,959 | 10/1989 | Herbst et al. | 204/109 |
| 4,902,390 | 2/1990 | Arnesen | 204/149 |

Primary Examiner—John Niebling
Assistant Examiner—Patrick J. Igoe
Attorney, Agent, or Firm—Gunn, Lee & Miller

[57] ABSTRACT

A device for purifying water of mineral contaminants, bacteria, protozoa, algae, fungus, and other undesirable impurities, as well as for preventing and removing scale from conduits and containers within which water is maintained, that utilizes an electronic circuit capable of generating a plurality of interacting electromagnetic fields. The circuitry is capable of generating the combination of a first static electromagnetic field of variable offset, a second radio frequency varying electromagnetic field, and a third low frequency varying electromagnetic field with high amplitude, short pulse width, spikes. In addition, the circuitry is capable of inducing a high negative ion concentration in the water within which electrodes connected to the circuitry are immersed. The invention anticipates the use of electrodes suitable not only for the flow of water about the electrodes through a conduit, but the placement of electrodes within a pool of water to be purified.

7 Claims, 3 Drawing Sheets

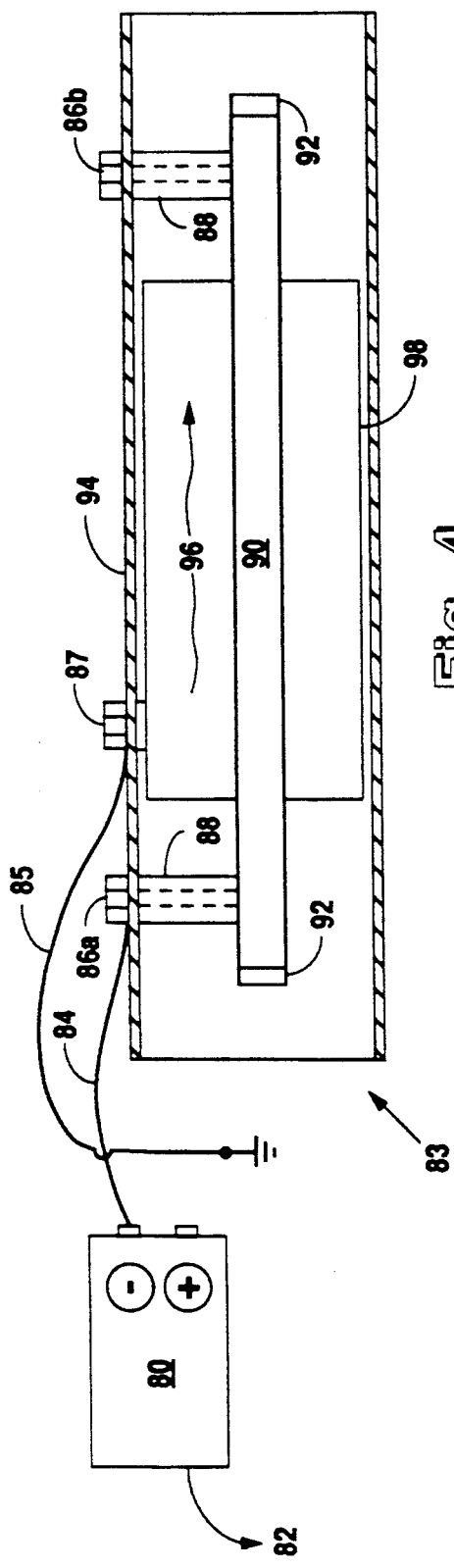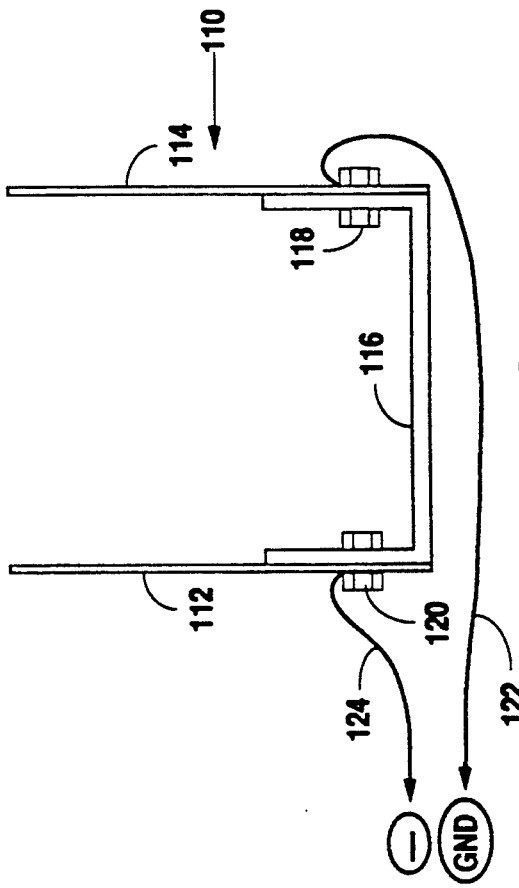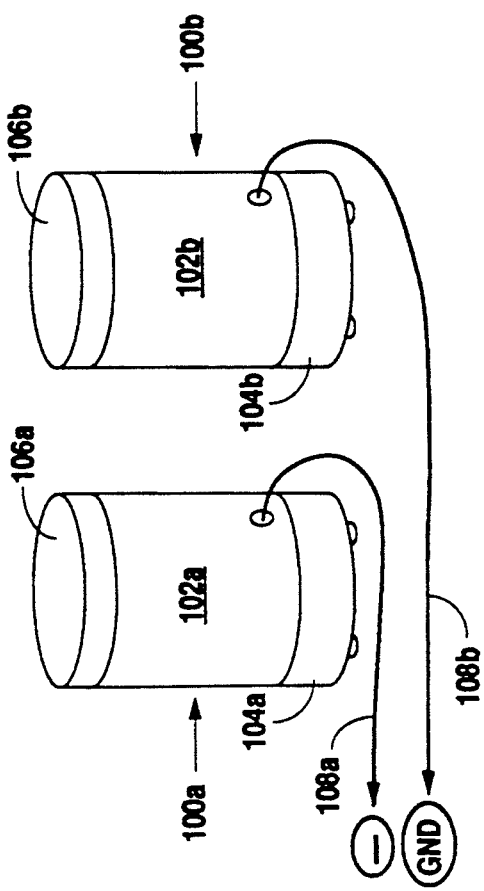

TREATMENT OF WATER WITH STATIC AND RADIO FREQUENCY ELECTROMAGNETIC FIELDS

BACKGROUND OF THE INVENTION

1. Field of the Invention

The apparatus and method of the present invention relate generally to devices and methods for purifying water through the use of electromagnetic fields. The apparatus and method of the present invention relate more specifically to an apparatus and method that utilize a combination of static, low frequency, and radio frequency electromagnetic fields, along with high negative ion flux to produce a range of purifying effects on water.

2. Description of the Prior Art

The use of electromagnetic properties to treat impurities that are commonly found in water is an old and well known practice. The basis for most devices that use electromagnetic fields and energy to purify or alter the characteristics of water is the fact that many impurities in water exist in ionic form and are, therefore, significantly affected by electromagnetic fields and charges placed in the water.

These ionic impurities are, of course, most significantly affected by the implementation of a static electric field within the water that directs ions of one polarity in one direction and ions of the opposite polarity in the opposite direction. The establishment of such a static electromagnetic field also serves to continuously disrupt the combination of negative and positive ions within the solution that tend to form solid precipitates that often clog conduits and containers for the water. Unfortunately, a typical side effect of the process of establishing a static electromagnetic field within a water container or conduit is the deposition of the ionic solids on the electrodes used to establish the field. After a period of time, the electrodes themselves require cleaning as they have attracted the ions of opposite polarity to such an extent that they become layered with precipitate and their efficiency is significantly reduced. The effect, therefore, is simply the redirection of the scaling from the conduit or container carrying the water to the electrodes that are placed within it.

In addition to the drawbacks identified above, the imposition of a static electromagnetic field on water is generally not effective against a broad spectrum of impurities known to exist in many water streams. Apart from the mineral precipitates that create impurity problems, there are additionally bacteria, protozoa, algae, fungus, etc., that are detrimental impurities in many water streams. For the most part, static electric fields have little or no affect on these so called "biological" impurities that may exist and may create problems as significant as the mineral scaling problems described above. There are devices in the field that have been constructed that utilize alternating electric current to create electromagnetic fields within a flow of water that are designed to selectively destroy bacteria contained within the water. U.S. Pat. No. 3,753,886, issued to Meyers on Aug. 21, 1973, describes Just such an apparatus, but determines the optimum functioning frequency to exist at 60 cycles per second. The Meyers patent hypothesizes a reason for the greater efficiency at low frequency alternating current, but specifically indicates a decrease in the efficiency of the device at higher frequencies. This leaves a number of forms of bacteria, protozoa, algae, fungus, etc., within the water and fails to completely purify the water as such. It would be advantageous to create and implement a device that incorporates not only a static electromagnetic field capable of handling ionic impurities as described above, but also a low frequency varying electromagnetic field, and a high frequency varying electromagnetic field, all in conjunction with a source for a high output of negative ions into the water. This combination of electromagnetic fields and ionic generation would be capable of attacking a broad spectrum of impurities commonly found in water. If a single circuit and electrode combination could be devised to implement this combination of generated electromagnetic fields, then a very simple and cost efficient means for a variety for water purification applications could be constructed.

SUMMARY OF THE INVENTION

It is therefore an object of the present invention to provide an electronic circuit capable of creating a plurality of electromagnetic fields within a water supply or flow that are capable of clarifying the water of a variety of impurities and undesirable contaminants.

It is another object of the present invention to provide an apparatus and method for generating a first high voltage static electromagnetic field, a second low frequency electromagnetic field, and a third high frequency electromagnetic field, that in combination, are capable of clarifying a water supply or flow of a broad spectrum of impurities and contaminants.

It is a further object of the present invention to provide an electronic circuit capable of generating a plurality of static, low frequency, and radio frequency electromagnetic fields capable of clarifying a water supply or flow of impurities and contaminants, and capable of functioning in conjunction with a simple arrangement of one or two electrodes.

It is a further object of the present invention to provide an apparatus for generating a plurality of electromagnetic fields and simultaneously generating a high concentration of negative ions within a water supply or flow, that in combination are capable of clarifying the water of a broad spectrum of impurities and contaminants.

It is a further object of the present invention to provide a method and apparatus for purifying water of ionic solids that are capable of allowing the ionic solids to precipitate of their own accord out of the solution and not to be directed to either the conduit or container within which the water is flowing or to any electrode of the system generating the electromagnetic fields.

It is a further object of the present invention to provide an electronic circuit that relies upon the use of electrodes whose physical configuration is simple and are not dependent upon the shape and/or configuration of the conduit or container within which the water flows.

In fulfillment of these and other objects, the present invention provides an electronic circuit capable of generating a range of radio frequency electromagnetic fields through one or more electrodes within water, which range of electromagnetic frequencies causes an output electromagnetic wave form and field that incorporates a high static offset, a low frequency component, a high frequency component, and results in an increase in the concentration of negative ions within the water.

The circuitry of the present invention achieves these objectives by the use of a power transistor to oscillate a low voltage iron core transformer at a broad range of radio frequencies. At particular intervals in the generation of these frequencies, the electromagnetic fields and waves reinforce each other and create high voltage spikes of relatively low frequency. The high voltage, low frequency spikes occur in a range from 100 to 10,000 volts and at frequencies from 10 cycles per second to several thousand cycles per second. These low frequency, high voltage pulses induce the formation of negative ions within the water as a result.

The underlying radio frequencies in the generated field and wave are preferably in the range from 10 to 2,000 kilocycles. Variations in any of the particular electromagnetic fields generated by the device can be made to specifically stream line the application according to the particular needs of the user. Where the primary contaminant and water supply is mineral solids, a high static field with a background radio frequency electromagnetic field allows for the prevention of scaling and, at the same time, eliminates the precipitation and scaling of the minerals on the electrodes themselves. Where mineral contaminants are less a concern and bacterial, algae, and protozoa contaminants are more of a concern, a higher radio frequency component at a lower static electromagnetic field might be appropriate. In any event, the apparatus of the present invention provides a single circuit that, thorough proper biasing and configuration, provides a plurality of static and varying electromagnetic fields capable of attacking a broad range of water contaminants and impurities.

This and other objectives of the present invention will become clear to those skilled in the art from the below description of a preferred embodiment and from the appended claims.

BRIEF DESCRIPTION OF THE DRAWINGS

FIG. 1A is a graphic representation of the electromagnetic signal generated by the circuitry of the present invention.

FIG. 4 is a cross sectional view of a second embodiment of the present invention showing implementation of the device within a conduit containing a flow of water to be treated.

FIG. 5 is a perspective view of a typical arrangement of electrodes suitable for cooling tower water purification.

FIG. 6 is a cross sectional view of a second embodiment of the electrode application shown in FIG. 5.

DESCRIPTION OF THE PREFERRED EMBODIMENT

Figure 1:
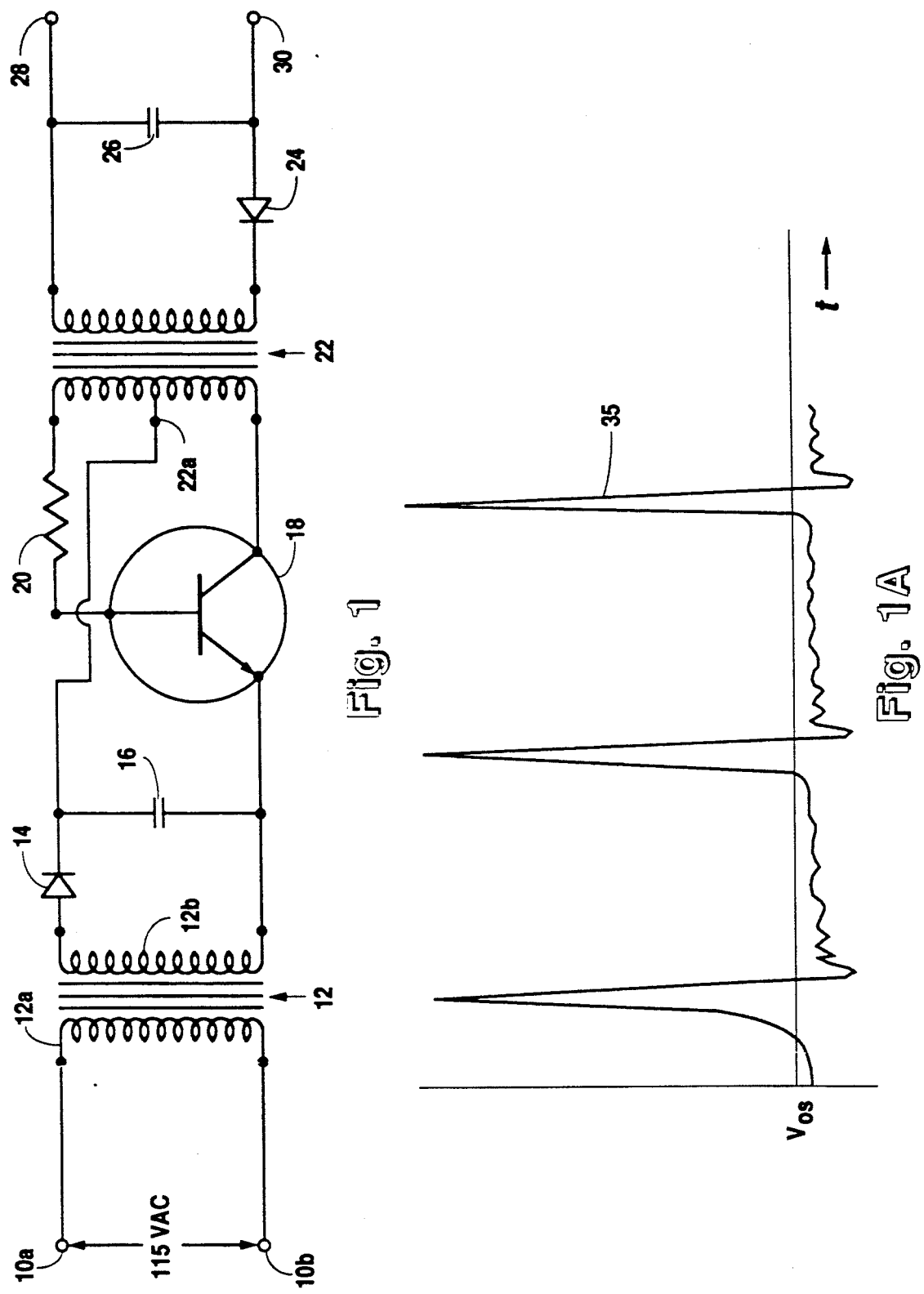
FIG. 1 is an electronic schematic showing the basic circuit elements of the present invention.

Reference is first made to FIG. 1 for a detailed description of the circuitry of the present invention common to each of the various applications that the preferred embodiments envision. The circuit's primary components include step down transformer (12), oscillating transistor (18), and step up transformer (22). A standard 115 volt AC power supply is connected across terminals (10a) and (10b) at the input to the circuitry. This powers the primary winding (12a) of step down transformer (12). Step down transformer (12) has a secondary winding that provides three volts to twelve volts at 0.3 amps. This voltage is then provided to the center tap (22a) of step up transformer (22) by way of diode (14). In the preferred embodiment, diode (14) is a 500 volt diode with a 1 amp rating. Filtering capacitor (16) is a 330 microfarad capacitor rated at 25 volts.

The combination of transistor (18), which is an NPN power transistor rated at 30 watts in the preferred embodiment, and step up transformer (22) creates an oscillator that puts out a voltage varying in a whole range of radio frequencies. Step up transformer (22) has a primary 6 volt center tap coil and a secondary coil with a 25 to 1 ratio rated at 1,500 volts at 10 milliamps. Resistor (20) may be any value from 390 ohms to 9,100 ohms and is used to provide the base voltage to transistor (18).

In combination, this power circuit provides radio frequency oscillations at the output of step up transformer (22). This signal is conditioned by diode (24), which is a 10,000 volt diode rated at 20 milliamps, and by capacitor (26), which is an 800 picofarad capacitor rated at 10,000 volts. This provides a radio frequency signal across terminals (28) and (30) that is connected to the electrodes of the present invention that are described in more detail below.

The operation of the above described circuitry creates a wave form similar to that shown in FIG. 1A. The reference base line shown in FIG. 1A ($V_{os}$) may be any DC offset desirable for the particular application involved. The importance of the output, however, lies in the wave form and the spiked pulses that the combination of radio frequencies periodically put out. This voltage spike of up to 2,000 volts or more results from the positive reinforcement of these radio frequencies on an intermittent basis. The frequency of the pulse itself provides the low frequency signal necessary for certain types of water purification. At the same time, the underlying radio frequencies in the signal provide the necessary electromagnetic fluxuations to eliminate other types of impurities in the water being treated. The pulse width of the wave form (35) described in FIG. 1A is approximately 10 microseconds. This pulse width, however, can be controlled by appropriate adjustment of the biasing of transistor (18) shown in FIG. 1. All of the characteristics of the output wave form (35) shown in FIG. 1A can be modified by appropriate biasing and resistance and capacitance changes to the circuitry in FIG. 1. Resistor (20), for example, might be replaced by a variable resistor which would allow user modification of the output frequencies. The only critical characteristics of the wave form is the inclusion of its underlying radio frequency, its low frequency pulse structure, the high voltage level of the pulse and the short pulse widths of the spikes. It is the combination of all of these wave elements that creates the versatility of the circuitry to drive electrodes in a number of different applications.

Figure 2:
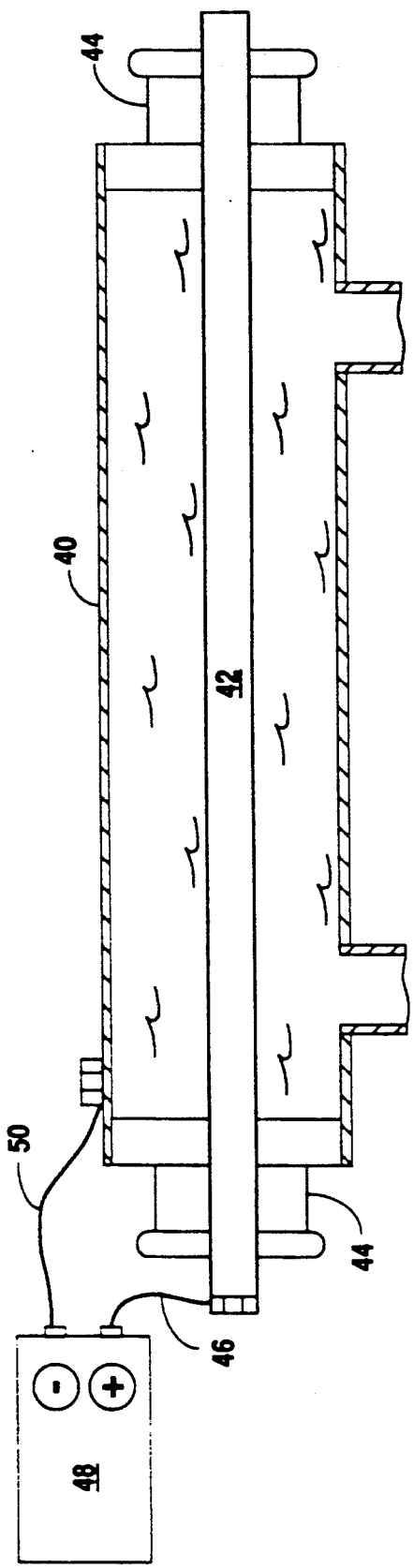
FIG. 2 is a cross sectional view of a prior art electrostatic water purifying unit.

Reference is now made to FIG. 2 for a brief description of a typical prior art electrostatic water purifying unit. The primary distinction between the present invention and other previous applications of electromagnetic energy to water involves the implementation of a plurality of electromagnetic waves and fields within the water rather than simply a static field. The apparatus shown in FIG. 2 is appropriate for establishing a static electromagnetic field between an inner core and an outer shell through which water is passed. In FIG. 2

(prior art) power unit (48) has an output of anywhere from 1,500 VDC to 10,000 VDC and has a positive terminal (46) connected to a central teflon insulated core (42). Core (42) is held centered within a water conduit (40) by compression fittings (44). The outer conduit (40) is itself conductive and is connected to the negative terminal (50) of power unit (48).

This prior art structure establishes a high voltage static electromagnetic field between the outer shell (40) of a conductive pipe and inner core (42). Although not shown in FIG. 2, this device could be used either within a container through which water is circulated or could be placed in line within a conduit through which water flows. In either case, the tendency of such devices is to collect the impurities within the device itself and to require cleaning and maintenance as a result.

Figure 3:
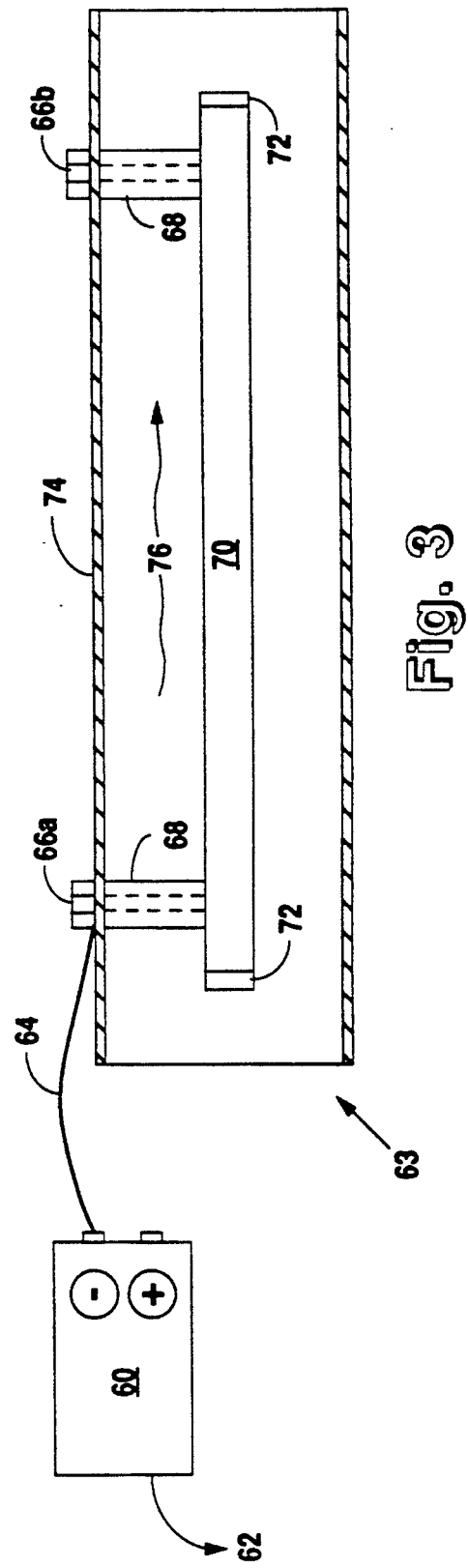
FIG. 3 is a cross sectional view of a first embodiment of the present invention shown as utilized within a conduit containing a flow of water to be treated.

Reference is now made to FIG. 3 for a detailed description of a cross sectional view of one preferred embodiment of the present invention. Power unit (60) is connected to a typical AC power source (62) as described above with respect to FIG. 1. Negative output (64) of power unit (60) is connected to PVC electrode unit (63) at a first stainless steel bolt (66a). Stainless steel bolt (66a) passes through the wall of PVC pipe (74) and attaches to stainless steel core electrode (70). Stainless steel core electrode (70) is spaced from the interior wall of PVC pipe (74) by way of insulating spacer (68). Stainless steel core electrode (70) is itself a stainless steel tube of a length appropriate for sufficient contact with water within the flow of the pipe. This typically means a length anywhere from 8" to 32" in length, depending upon the application. Stainless steel electrode (70) is closed at each end within caps (72). A far end of stainless steel electrode (70) is also attached and held in place within PVC pipe (74) by way of a second stainless steel bolt (66b). This attachment is also accomplished with a spacer (68) so as to keep stainless steel electrode centered within PVC pipe (74). A flow of water (76) can then be passed around and about stainless steel electrode (70), being purified as it proceeds along the electrode. It is assumed, although not shown in FIG. 3, that the water within the flow of PVC electrode unit (63) is at a ground potential from the grounded metal piping that the water is typically flowing through. It is understood that the PVC electrostatic unit described in FIG. 3 could be connected to any of a number of different standard PVC couplings and plumbing fixtures. The diameter of PVC pipe (74) is variable according to the type of fixture involved. In a preferred embodiment, the PVC pipe (74) utilized is a standard 4" schedule 40 PVC and the stainless steel core electrode (70) is a standard ¾" or 1" stainless steel pipe.

Reference is now made to FIG. 4 for an alternative preferred embodiment of the electrode structure of the present invention. Like the embodiment shown in FIG. 3, PVC electrode unit (83) shown in FIG. 4 is connected to power unit (80) which is itself connected to a standard AC power source (82). In this case, however, the negative terminal (84) of power unit (80) is connected to centered electrode (90) and a grounded terminal (85) is connected to a surrounding electrode (98) to provide the ground potential in completely ungrounded systems such as PVC irrigation systems. Negative terminal (84) is connected to stainless steel centered electrode (90) just as in the previous embodiment. This connection is made by way of stainless steel bolt (86a) through the use of spacer (88) and is accomplished much in the same way as described above. Stainless steel electrode (90) is capped on each end within plugs (92).

In addition, however, the second preferred embodiment includes a surrounding ground electrode (98) that is placed within PVC pipe (94). The ground output (85) from power unit (80) is connected through the wall of PVC pipe (94) by way of stainless steel bolt (87). Stainless steel bolt (87) is attached to stainless steel inner liner (98) which surrounds, but is not in contact with stainless steel electrode (90). Water flow (96) passes within and between stainless steel inner liner (98) and stainless steel electrode (90).

As with the embodiment described in FIG. 3, the device showing in FIG. 4 can easily be connected to any of a number of PVC plumbing fixtures through standard PVC couplings, adapters, etc. Again, the dimensions of the device are similar to those described with FIG. 3 and are adaptable for various applications from small PVC fixtures (on the order of 1" to 2") to very large (4" to 24").

The embodiments disclosed in FIGS. 3 and 4 are suitable primarily for installations where a constant flow of water past the electrodes is anticipated. These embodiments, however, are easily adaptable to containers that are typically used in conjunction with electrostatic water purifying units. One such canister type unit is described generally in U.S. Pat. No. 4,419,206, wherein two electrodes are immersed in water contained within a canister that circulates by turbulent flow. It is expected that any number of electrode configurations could be conceived according to a particular application that the unit is intended for.

FIGS. 5 and 6 on the other hand are directed to a larger scale application, wherein the electrodes are installed within large industrial operations such as cooling towers for power plants and the like.

In a typical cooling tower installation, the water being circulated resides primarily in a shallow pool at the base of the cooling tower. Through various means, the water is raised and lowered and is cooled in the process. The electrodes shown in FIG. 5 are designed to be placed within the pool of water at the base of the cooling tower and to impart the necessary electromagnetic fields to the water to carry out the purification and decontamination process. The electrodes (100a) and (100b) shown in FIG. 5 are of fairly simple construction and are primarily comprised of rolled stainless steel sheets (102a) and (102b). These rolled stainless steel sheets (102a) and (102b) could simply be large stainless steel cylinders on the order of 8" to 18" in diameter. The cross sectional configuration of these electrodes (100a) and (100b) is not so important as is their outer surface area that comes in contact with the water. Plastic bases (104a) and (104b) are provided to stainless steel rolled cylinders (102a) and (102b) for the purpose of elevating the cylinders to an appropriate level within the water pool. Plastic caps (106a) and (106b) are used to prevent the presence of stagnate water within the center of electrodes (100a) and (100b). In the preferred embodiment, electrode (100a) is connected to the negative terminal of the power unit described above by way insulated electrical conductor (108a). Likewise, a second electrode (100b) is connected to the ground output of the power unit described above by way of insulated electrical conductor (108b).

It is possible to operate the system of the present invention with only a single negative electrode, as long as the water flows through grounded piping and conduits within the water cooling tower.

Reference is now made to FIG. 6 for a modification of the embodiment shown in FIG. 5, wherein a single electrode unit is used in place of the double electrodes described above. In FIG. 6, a cross sectional view is shown of a dual plate electrode (110) that is used in applications similar to that as shown in FIG. 5. The dual plate electrodes (112) and (114) are mounted on plastic base (116) which again serves to raise electrodes (112) and (114) appropriately above the pool floor of the cooling tower unit. A first stainless steel plate (112) is connected to plastic base (116) by way of stainless steel bolt (120). The negative output of the power unit is connected to stainless steel plate (112) at stainless steel bolt (120) by way of electrical conductor (124). Likewise, a second stainless steel plate (114) is connected to an opposite side of plastic base (116) by way of stainless steel bolt (118). The ground output of the power unit is connected to second stainless steel plate (114) at stainless steel bolt (118) by way of electrical conductor (122). Electrode plates (112) and (114) may be generally rectangular in structure and base (116) may be suitably shaped to hold plates (112) and (114) in an orientation perpendicular to the pool floor of the cooling tower unit.

There are some instances when the spacing between the electrodes dictates that the arrangement shown in FIG. 5 be utilized and some instances where the proximity of the electrodes to each other, as shown in FIG. 6, is of greater benefit. This depends on the size of the pool, the magnitude of the static voltage, and the availability of grounding locations.

As described previously, the power unit of the present invention can be used in different modes depending upon the particular application. Adjustments to the power unit to emphasize a static electromagnetic field offset or a particular combination of radio frequency and low frequency pulses can be made. In general, it is the radio frequency components of the output signal that prevents the buildup of scaling deposits directly on the electrodes themselves. In the embodiment described in FIG. 5, for example, it has been found that not only is the formation of scale within the cooling tower unit reduced, the electrodes themselves do not require cleaning and the mineral content of the water eventually precipitates out as a fine silt in the base of the cooling tower pool. The present systems also, because of the radio frequency signals, start breaking up scale that has accumulated within a water conduit or container and will eventually remove such scale to again be silted out in a fine powder form.

The radio frequencies also contribute to the effectiveness of the system in sterilizing and decontaminating water containing bacteria, amoeba, protozoa, algae, fungus, etc. Critical to this "biological" contaminant purification is the fast rising spike in the signal as opposed to merely the implementation of low amplitude radio frequency waves. This low frequency spike appears to act as a shock to the bacteria, amoeba, protozoa, etc., within the water and to break down their protective mechanisms.

When the power unit is used primarily as a high static high voltage generator, as in descaling applications, the preferred voltage output is generally between 2,000 and 5,000 volts. The system can function with as low as a 1,000 volt and as high as a 10,000 volt static field. No improvement appears in operation, however, above 3,000 volts.

When the unit is used as a combination static high voltage generator and a high negative ion generator, the preferred output voltage is generally between 3,500 and 5,000 volts static field. When the power unit is used strictly as a negative ion generator, the preferred voltage output is 1,500 to 3,000 volts static field with a resultant negative ion output of approximately 100 to 2,000 volts.

When the power unit is used to control bacteria, ameba, protozoa, algae, fungus, etc., the power unit pulse rate frequency is set to coincide with generally accepted frequencies that controls particular types of organisms. For example, the control frequency for *E. Coli* bacteria is generally known to be 802 cycles per second. The voltage output on such frequencies is preferably between 2,000 and 5,000 volts.

While the above is a description of the construction and operation of a number of preferred embodiments of the present invention, the below appended claims are anticipated as encompassing all modifications and equivalents that do not depart from the scope of the invention as described.

I claim:

1. An apparatus for the treatment, purification, and decontamination of water comprising:
   a first electrode capable of being immersed in said water to be purified;
   an electromagnetic field generator, said electromagnetic field generator capable of concurrently producing;
   a first static electromagnetic bias field;
   a second radio frequency electromagnetic field; and
   a third low frequency electromagnetic field;
   said electromagnetic field generator further capable of generating negative ions within said wate;
   said electromagnetic field generator comprising:
   a first step down transformer;
   a second step up transformer; and
   a power transistor positioned across a primary winding of said second step up transformer:
   wherein a secondary winding of said step up transformer is connected to said first electrode and wherein the combination of said power transistor and said step up transformer creates an oscillator whose variable output is provided to said first electrode through said secondary winding of said step up transformer.

2. The apparatus of claim 1 further comprising:
   a second electrode immersible in said water to be purified, said first electrode connected to a first negative output of said electromagnetic frequency generator, and said second electrode connected to a grounded output of said electromagnetic frequency generator.

3. The apparatus of claim 1, wherein said first electrode is a stainless steel pipe centrally positioned within a conduit containing a flow of said water to be purified.

4. The apparatus of claim 2, wherein said first electrode is a stainless steel pipe centrally positioned within a conduit containing a flow of said water to be purified, and said second electrode is a cylindrical stainless steel cylindrical liner surrounding and spaced from said first electrode and within said conduit containing said flow of water to be purified.

5. The apparatus of claim 1, wherein said first electrode comprises:
a nonconductive base; and
an electrically conductive shell supported by said nonconductive base, wherein said electrically conductive shell as supported by said nonconductive base is at least partially immersed within a pool of said water to be purified.

6. The apparatus of claim 2, wherein said first and said second electrodes each comprise a nonconductive base and an electrically conductive shell supported by said nonconductive base, and wherein each of said electrodes is at least partially immersed within a pool of said water to be purified.

7. The apparatus of claim 2, wherein said first electrode and said second electrode are each supported on a single nonconductive base, said first electrode supported on a first side of said nonconductive base and said second electrode supported on a second opposing side of said nonconductive base.

* * * * *